(12) United States Patent
Moore

(10) Patent No.: US 10,465,491 B2
(45) Date of Patent: Nov. 5, 2019

(54) OIL AND GAS WELL PRODUCED SALTWATER TREATMENT SYSTEM

(71) Applicant: Joe Travis Moore, Tulsa, OK (US)

(72) Inventor: Joe Travis Moore, Tulsa, OK (US)

(*) Notice: Subject to any disclaimer, the term of this patent is extended or adjusted under 35 U.S.C. 154(b) by 0 days.

(21) Appl. No.: 15/685,863

(22) Filed: Aug. 24, 2017

(65) Prior Publication Data
US 2019/0048701 A1    Feb. 14, 2019

Related U.S. Application Data

(60) Provisional application No. 62/495,014, filed on Aug. 27, 2016.

(51) Int. Cl.
| | |
|---|---|
| *E21B 43/34* | (2006.01) |
| *C02F 1/04* | (2006.01) |
| *C02F 1/16* | (2006.01) |
| *C02F 9/00* | (2006.01) |
| *C02F 1/58* | (2006.01) |
| *F01K 25/10* | (2006.01) |

(Continued)

(52) U.S. Cl.
CPC .............. *E21B 43/34* (2013.01); *C02F 1/048* (2013.01); *C02F 1/16* (2013.01); *C02F 1/58* (2013.01); *C02F 9/00* (2013.01); *F01K 25/10* (2013.01); *F01N 5/02* (2013.01); *C02F 1/06* (2013.01); *C02F 1/08* (2013.01); *C02F 1/10* (2013.01); *C02F 1/5236* (2013.01); *C02F 2101/12* (2013.01); *C02F 2103/365* (2013.01); *C02F 2303/10* (2013.01); *E21B 43/26* (2013.01)

(58) Field of Classification Search
CPC .......... E21B 43/34; F01K 25/10; C02F 1/048; C02F 1/16; C02F 1/58; F01N 5/02
See application file for complete search history.

(56) References Cited

U.S. PATENT DOCUMENTS

| | | | |
|---|---|---|---|
| 3,361,647 A * | 1/1968 | Brown ..................... | C01D 3/06 122/4 R |
| 4,318,772 A | 3/1982 | Kragh | |

(Continued)

FOREIGN PATENT DOCUMENTS

| | | | | |
|---|---|---|---|---|
| CN | 102452691 | * | 5/2012 | ................ C02F 1/16 |
| CN | 104445782 | | 3/2015 | |

(Continued)

OTHER PUBLICATIONS

WIPO machine translation of CN 102452691, published May 2012, 3 pages.*

(Continued)

*Primary Examiner* — Brian A McCaig
(74) *Attorney, Agent, or Firm* — Dennis D. Brown; Brown Patent Law, P.L.L.C.

(57) ABSTRACT

An integrated process which simultaneously removes water and precipitated salts from oil and gas well produced saltwater, thus reducing or eliminating the cost and environmental problems associated with waste water disposal, while adding revenue through electrical production and other coproducts. The addition of a zero emissions engine will also convert wellhead natural gas into carbon neutral, emission free electrical and thermal energy, along with facilitating additional products further reducing the cost of processing the saltwater.

20 Claims, 16 Drawing Sheets

(51) Int. Cl.
*F01N 5/02* (2006.01)
*C02F 1/06* (2006.01)
*C02F 1/08* (2006.01)
*C02F 1/10* (2006.01)
*C02F 1/52* (2006.01)
*C02F 101/12* (2006.01)
*C02F 103/36* (2006.01)
*E21B 43/26* (2006.01)

(56) References Cited

U.S. PATENT DOCUMENTS

| | | |
|---|---|---|
| 4,553,396 A | 11/1985 | Heizer |
| 5,366,514 A | 11/1994 | Becnel et al. |
| 6,090,186 A * | 7/2000 | Spencer ............. B01D 53/1475 |
| | | 423/220 |
| 7,073,337 B2 | 7/2006 | Mangin |
| 7,531,144 B2 | 5/2009 | Borseth |
| 8,517,355 B2 | 8/2013 | Rushmore et al. |
| 8,535,538 B1 | 9/2013 | Keeling et al. |
| 8,857,798 B1 | 10/2014 | Spaeeow et al. |
| 9,199,861 B2 | 12/2015 | Duesel, Jr. et al. |
| 9,617,169 B2 | 4/2017 | Covindan et al. |
| 2004/0103637 A1 | 6/2004 | Maisotsenko et al. |
| 2006/0000355 A1* | 1/2006 | Ogura ..................... B01D 1/14 |
| | | 95/224 |
| 2012/0199534 A1 | 8/2012 | Holtzapple et al. |
| 2013/0264185 A1 | 10/2013 | Brillantes, Jr. et al. |
| 2015/0202545 A1 | 7/2015 | Duesel, Jr. et al. |
| 2016/0069577 A1 | 3/2016 | Dinnage |
| 2016/0096744 A1 | 4/2016 | Rutsch et al. |
| 2016/0368783 A1 | 12/2016 | Ertel et al. |

FOREIGN PATENT DOCUMENTS

| | | |
|---|---|---|
| CN | 106730959 | 5/2017 |
| WO | WO2010063341 | 6/2010 |
| WO | WO2014047676 | 4/2014 |

OTHER PUBLICATIONS

International Search Report and Written Opinion for PCT/US2017/048476; dated Nov. 9, 2017; US.

* cited by examiner

OIL AND GAS WELL PRODUCED SALTWATER TREATMENT SYSTEM

RELATED CASE

This application claims the benefit of U.S. Provisional Patent Application Ser. No. 62/495,014 filed on Aug. 27, 2016 and incorporates said provisional application by reference into this document as if fully set out at this point.

BACKGROUND

This relates to the treatment for disposal or recycle of water produced from oil and gas wells either after tracking operations or during normal production of water from the formation.

Salt water is produced from oil and gas wells either as a result of water injection into the formation during tracking operations or as a result of the natural water content of the formation. As oil or gas is produced, this water accompanies these products to the surface and must be separated and disposed of. Common methods of disposal are the collection and reinjection into the same or other deep formation. Deep water injection is being linked to earthquakes, and alternative disposal methods are required.

Other methods of disposal utilize onsite treatment for salt removal by evaporation or filtration to reduce volume and concentrated water injected or hauled to a disposal or retention facility. These methods are energy intensive and do not address the waste product disposal issue. Some tracking water has been trucked to regional commercial treatment facilities that dilute the sail water and discharge it into surface water bodies. This has led to fresh water contamination in some areas of the country.

A solution is required that reduces the quantities of water being injected and keeps the cost of a disposal to a minimum and docs not create an additional waste disposal problem in some other area. As crude oil prices drop, some wells will need to stop production if cost effective solutions are not available.

Some wells produce natural gas that must be flared because there is not an infrastructure in place to get the gas to market. These wells are the most likely candidates for a technology that reduces the volume of water using wellhead gas as an energy source.

SUMMARY OF THE INVENTION

The present invention satisfies the needs and alleviates the problems discussed above. An integrated process is provided which simultaneously removes water and precipitated salts from oil and gas well produced saltwater, thus reducing or eliminating the cost and environmental problems associated with waste water disposal, while also optionally adding revenue through electrical production and other coproducts. A further option is the addition of a new zero emissions engine, (ZEE), which converts wellhead natural gas into carbon neutral, emission free electrical and thermal energy, along with facilitating additional products further reducing the cost of processing saltwater.

In one aspect, there is provided a method for reducing or eliminating saltwater that is generated as a result of oil and gas production, fracking, or other processes comprising: (a) delivering the saltwater through an evaporative fluid cooler which evaporates part of the water in the saltwater solution by adding heat from other parts of the system through a cooling media preferably comprising of a mixture of water and glycol or refrigerant or similar substance; (b) raising the concentration of the salt in the saltwater solution to a predetermined concentration below the level that will not lead to fouling of the evaporative cooler; and (c) sending concentrated saltwater to other processes on or offsite, an injection well or an evaporation pond.

In another optional aspect of the method described above, the concentrated saltwater can be sent to a direct or indirect contact tower where additional water is boiled off, thus increasing salt concentration to near saturation through heat transfer by heat generated by an exhaust stream from a burner combusting a mixture of air and wellhead gas. The burner exhaust stream can be directly exposed to the saltwater in a direct contact tower complete with heat transfer media allowing heat transfer from the exhaust gas to the saltwater, promoting evaporation and raising the salt concentration to just under saturation at elevated temperature. Alternatively, the burner exhaust stream can be indirectly exposed to the saltwater in an indirect contact tower where exhaust gas enters one side of a heat transfer surface and the saltwater enters the other side of a heat transfer surface allowing heal transfer from the exhaust gas to the saltwater, promoting evaporation and raising the salt concentration to just under saturation at elevated temperature without cross contamination of the saltwater with carbon dioxide or other combustion product allowing for recovery of saltwater vapor through heat exchanger and cooling media. In either case, the saltwater will preferably be directed to a holding lank where the temperature is dropped by cooling media releasing solids and allowing transfer of the solids and saturated saltwater to other processes on or offsite, an injection well, or an evaporation pond.

In another optional aspect of the method described above, the saturated saltwater can be reduced to water vapor and dry solids using (i) a burner combusting a mixture of air and wellhead gas in a flash dryer where saltwater is sprayed directly into the rising exhaust stream allowing water to boil off and be carried up by the exhaust stream allowing dry solids to tall to the bottom for sale or disposal, or (ii) a thin film evaporator where saltwater is fed to the top of a tower and allowed to flow down along the inner wall of a heat transfer surface in a thin film developed by rotating blades allowing water to evaporate and salts to travel to the bottom of the tower with the aid of the rotating blades, where it is collected for sale or disposal and the water vapor can be recovered and sold as freshwater.

In another optional aspect of the method described above, a part of the burner heat can be used to produce electrical power through the use of an organic Rankine cycle, ORC engine and generator. The ORC engine and generator allows for the operation of the saltwater treatment system in areas where there is no electrical power available or to generate additional income through the sale of electrical power to make the process more cost effective.

In another optional aspect of the method described above, process heat and electrical power can be produced by an internal combustion engine which drives an electrical power generator. The internal combustion engine and generator allow for the operation of the saltwater treatment system in areas where there is no electrical power available or to generate additional income through the sale of electrical power to make the process more cost effective.

In another optional aspect of the method described above, a Chlor-Alkali process that produces chlorine gas, hydroxides and hydrochloric acid can be added to the saltwater treatment system. The sale of these items would generate additional income to make the process more cost effective and aid in the removal of salts from the saltwater.

In another optional aspect of the method described above, a steam cogeneration system can be added to the internal combustion engine, increasing the electrical production efficiency. The sale of the additional electricity would generate additional income to make the process more cost effective.

In another aspect, a zero emissions engine (ZEE) is provided which can be used in the method described above or in other applications. When used in the method described above, the ZEE can be used to convert wellhead natural gas into carbon neutral, emission free electrical and thermal energy. Coproducts such as argon and nitrogen can be sold to generate additional income, making the process more cost effective with little or no environmental impact. Carbon dioxide can be used to enhance salt separation by promoting the formation of calcium carbonates, resulting in mineral sequestration of the carbon dioxide. The carbon dioxide could also be sequestered in deep formation or sold for oil production enhancement or other use generating additional income further improving the saltwater treatment system economies.

In another optional aspect of the method described above, a hydrogen reformer can be added to the process to produce a hydrogen fuel with an exhaust that can be utilized as a direct steam source. This steam can be used to drive the hydrogen reformer and additional processes. The hydrogen can also be used as a feedstock for other processes such as methanol production further improving the economics of the saltwater treatment system.

In another optional aspect of the method described above, ammonia production can be added to the system. This allows for the utilization of the hydrogen and nitrogen coproducts, further improving the economics of the saltwater treatment system and increasing the waste heat used to evaporate the saltwater.

Further aspects, features and advantages of the present invention will be apparent to those in the art upon examining the accompanying drawings and upon reading the following Detailed Description of the Preferred Embodiments.

BRIEF DESCRIPTION OF THE DRAWINGS

Some embodiments are described with respect to the following figures.

DETAILED DESCRIPTION OF THE PREFERRED EMBODIMENTS

Figure 1A:
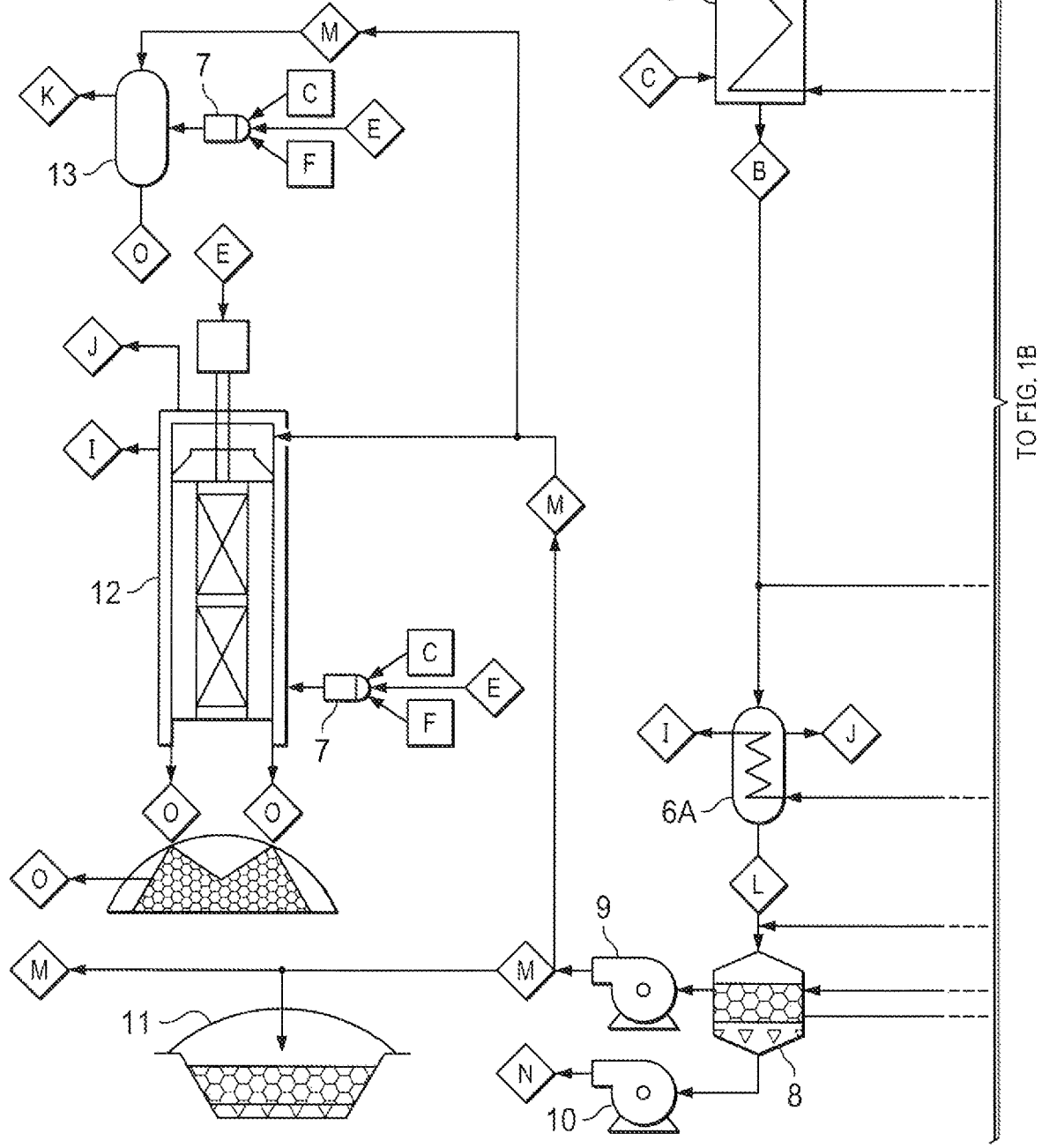
FIGS. 1A and 1B together show a schematic depiction of an embodiment that uses wellhead gas to reduce the volume of water produced by the well by up to 100%, using a gas burner, evaporative cooler, evaporation contact tower, tanks, circulation pumps, heat exchangers, air blowers, evaporation pond and spray dryer or thin film evaporator to totally evaporate water leaving dry salts with an option to recover freshwater.

The inventive saltwater treatment system (STS) is an integrated process that simultaneously removes water and precipitated salts from oil and gas well produced saltwater, thus reducing or eliminating the cost and environmental problems associated with waste water disposal. Water removal is accomplished in the first stage by evaporation in a fluid cooler, which uses a cooling media to transfer heat from the stage two cooling section. This increases the salt concentration from the initial value up to a point just below the saturation point for a given water temperature. Next, a heat source is used to increase the saltwater temperature to the boiling point, and water is boiled off, in a direct or indirect contact tower. The hot saturated saltwater then falls into a holding tank, where the temperature is dropped to below saturation temperature, via the cooling media, and salts are precipitated out of the salt water solution. The direct or indirect contact tower is selected based on the characteristics of the producer salt water and the final disposition of the concentrated solution of salt water and salt precipitants. Some salts have a considerable value and can be post processed to create an additional revenue stream. A lined evaporation pond, thin film evaporator, and/or flash dryer, on or offsite, can be used to remove the final percentage of water, leaving the dry precipitated salts for sale as road salt, further processing or disposal.

In one embodiment, the produced saltwater is pumped from a storage tank, into the top of the fluid cooler. Air is driven into the fluid cooler by an integral fan and directly contacts the saltwater, dropping its temperature to the atmospheric associated wet bulb temperature through evaporation. The cooling media is circulated through a wetted surface heat exchanger in the fluid cooler at a temperature above the wet bulb temperature. This promotes additional evaporation, to maintain the wet bulb temperature. The saltwater and air flow are balanced to control the concentration of the leaving saltwater.

The saltwater then enters the contact tower, where a heat source increases its temperature and boils off additional water. The heat source can be a burner that uses well produced natural gas combined with air to directly or indirectly add heat to the saltwater. If a well is flaring gas, this embodiment can replace the flare, or at least utilize that gas for a constructive purpose. The direct contact tower utilizes a packing material or trays to promote heat transfer by increasing surface area and residence time. The burner gas flow is adjusted to maintain the exiting temperature of the exhaust and water vapor above the condensing point.

While this direct tower is more efficient, there can be some contaminants introduced into the concentrated salt solution and precipitants that can reduce the value of these commodities. A potential benefit of this direct contact is the introduction of $CO_2$ into the salt solution, which in some cases can promote the formation of hydroxides, which have a lower solubility, thus increasing solids precipitation. The indirect contact tower uses a heat exchanger to separate the burner exhaust gasses from the saltwater. This eliminates the contaminate issues, but has less heat transfer efficiency. A saltwater analysis will be used to determine the type of contact tower.

Saltwater leaves the contact tower as a hot concentrated solution. It then enters a solids separation tank, where the temperature is dropped by a cooling media and heat exchanger. Salts precipitate out as the temperature drops and are collected on the bottom of the sloped bottom tank. A solids transfer pump removes these solids and transfers them to either a drying bed or transport truck to be further processed or land filled. The concentrated saltwater is pumped to either a covered, lined evaporation pond, thin film evaporator, flash dryer or truck for transport to an offsite facility for further processing.

Figure 1B:
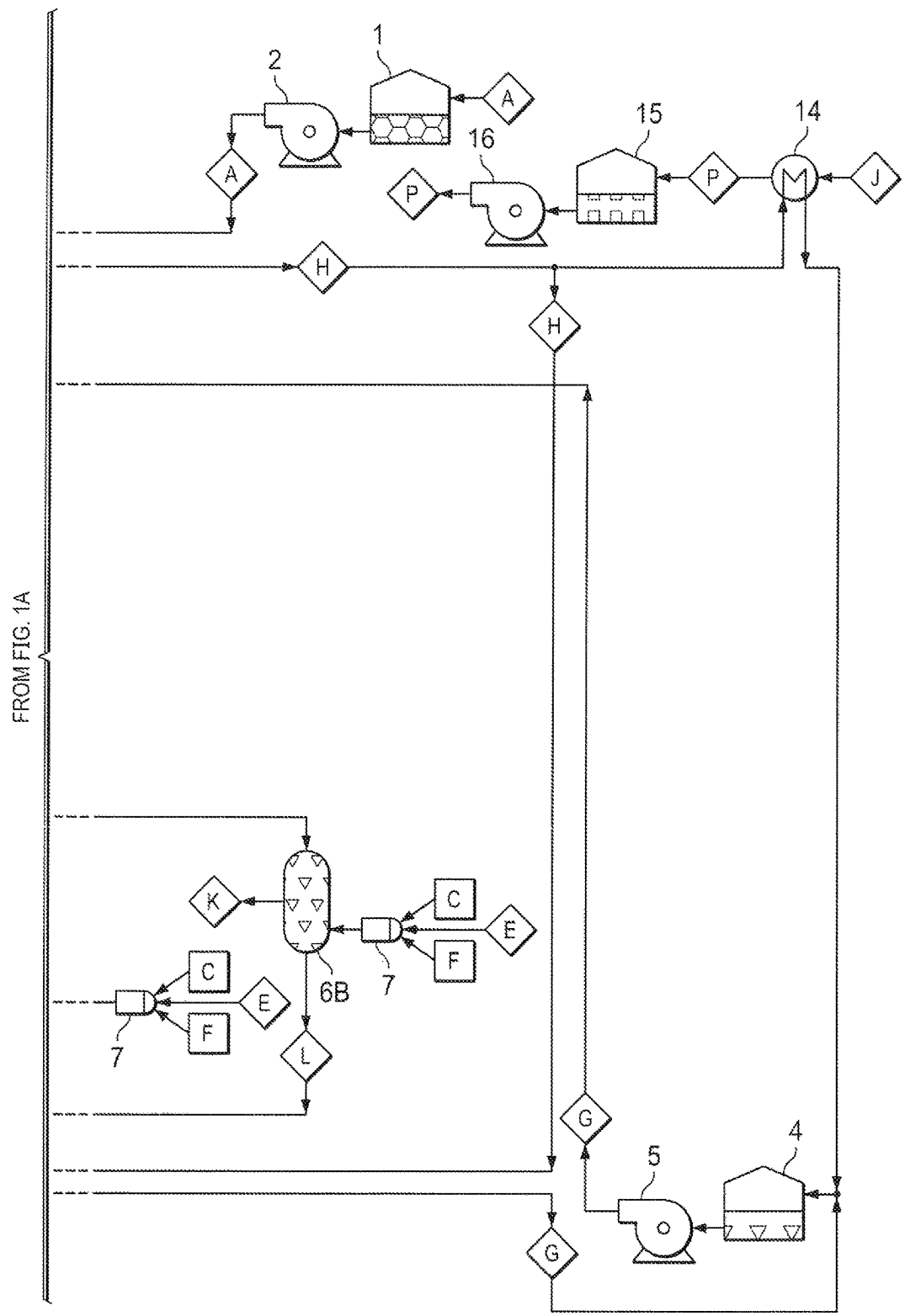

Oil/Gas well produced water, (saltwater), is collected in tank 1 on FIGS. 1A-B. Saltwater A is moved by pump 2 into an evaporative fluid cooler 3, where part of it is evaporated resulting in concentrated saltwater B. Air C is introduced and saltwater is cooled to at or near the atmospheric associated wet bulb temperature through evaporation and leaves as air and water vapor D.

Electricity E is used to power an integral fan to move the air. The return cooling media G is circulated through an integral welted surface heat exchanger in the fluid cooler at a temperature above the wet bulb temperature. This promotes additional evaporation, to maintain the wet bulb temperature resulting in a lower temperature cooling media supply H. Cooling Media G is stored in tank 4 and circulated by pump 5.

The concentrated saltwater B then enters the contact lower 6, where it is heated by burner 7 using well gas F, air C and electricity E. The burner heat increases the temperature to the boiling point and boils off additional water. Burner exhaust and water vapor leave the contact lower as separate streams exhaust I and water vapor J in the indirect contact tower or combined exhaust and water vapor K in the direct contact tower. High concentrated saltwater L leaves the contact tower and enters a separation tank 8, where it is cooled by integral heat exchanger using cooling media H and salt is precipitated out. Saturated saltwater M is conveyed by pump 9 to evaporation pond 11, thin film evaporator 12, flash dryer 13 or to truck for transport off site. The precipitated wet salts N are conveyed by pump 10 to a drying bed or to a truck for transport offsite.

The lined evaporation pond 11 has a cover to prevent rain water dilution. It would be sized to match evaporation with incoming flow. Eventually, the flow would be diverted to another evaporation pond or salt drying system and the salt solids allowed to dry completely and trucked offsite.

The thin film evaporator 12 produces dry salt solids as well, using a burner 7, fueled by well gas F, air C and electrical power E. Saturated saltwater M is conveyed to the top of the unit where it is released around the inner surface of the vertical heating drum. A set of blades spread the saturated saltwater in a thin layer, where the water is boiled off by the burner exhaust 1 on the outer surface of the heating drum. The blades also keep the solids from being deposited on the drum by conveying it to the bottom of the evaporator as dry salt solids O. Water vapor J is vented to atmosphere or can be directed to a water recovery system if desired.

An alternate flash dryer 13 produces dry salt solids as well, using a burner 7, fueled by well gas F, air C and electrical power E. Saturated saltwater M is conveyed to the top of the unit, where it is sprayed into the flash dryer where it interacts with the hot burner gases. Dry salt solids O fall to the bottom and a mixture of exhaust gases and water vapor K exit to atmosphere through the top of the unit or directed to a water recovery system if desired. The flash dryer can be located on or off site.

Another feature is a water recovery system that would take water vapor J and K, produced by the various components, and condense out fresh water P for local use or sale. Heal exchanger 14 would use cooling media supply H to condense water vapor from stream J or K into fresh water P, which would be stored in fresh water tank 15. Pump 16 would transfer the fresh water to a local system for internal use, pipeline or truck for sale.

Figure 2A:
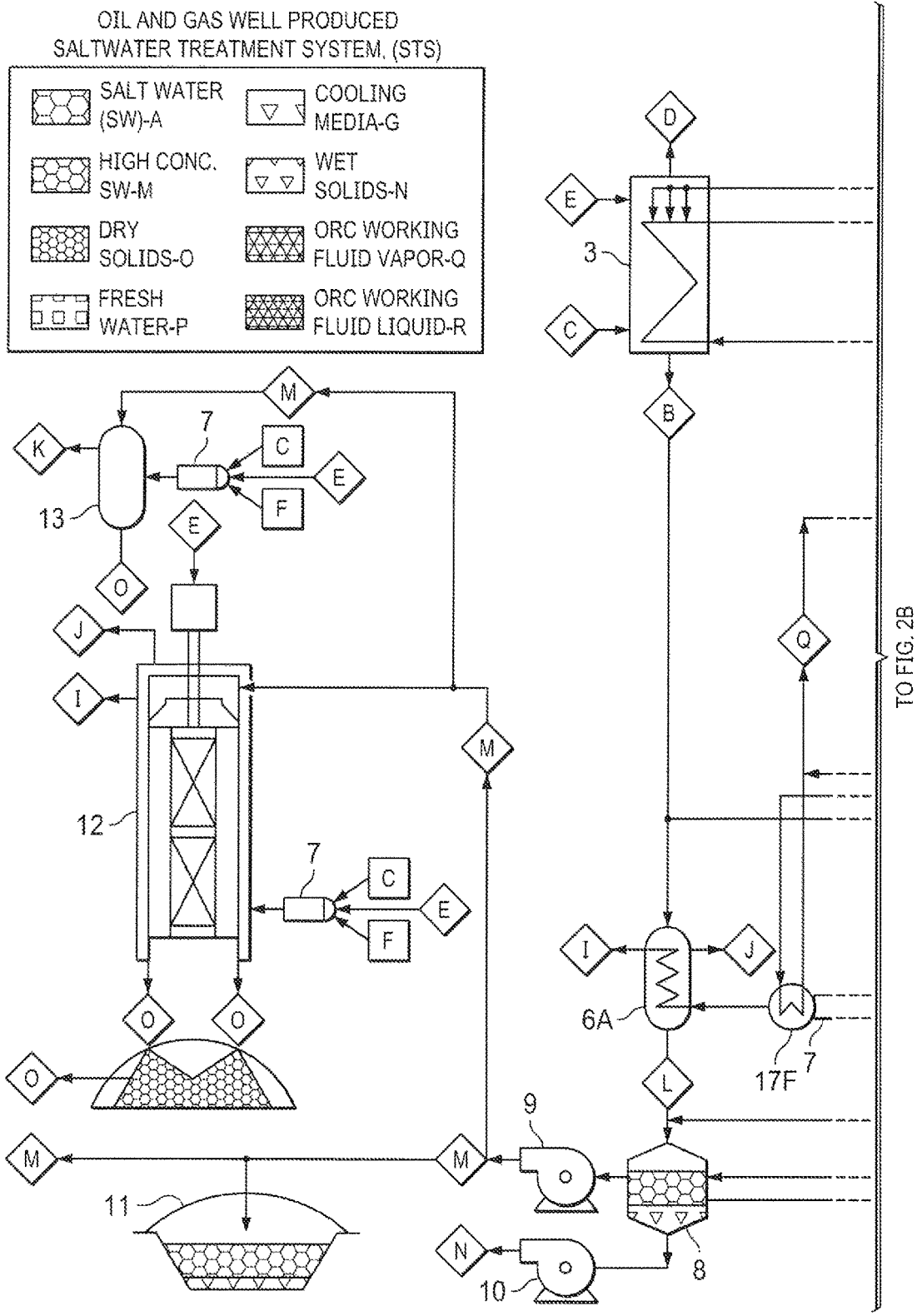
FIGS. 2A and 2B together show a schematic depiction of the embodiment depicted in FIGS. 1A and 1B with an Organic Rankine Cycle, ORC, and electrical generator to power the process when electrical power in not available or to generate additional income from the sale of electricity.
Figure 2B:
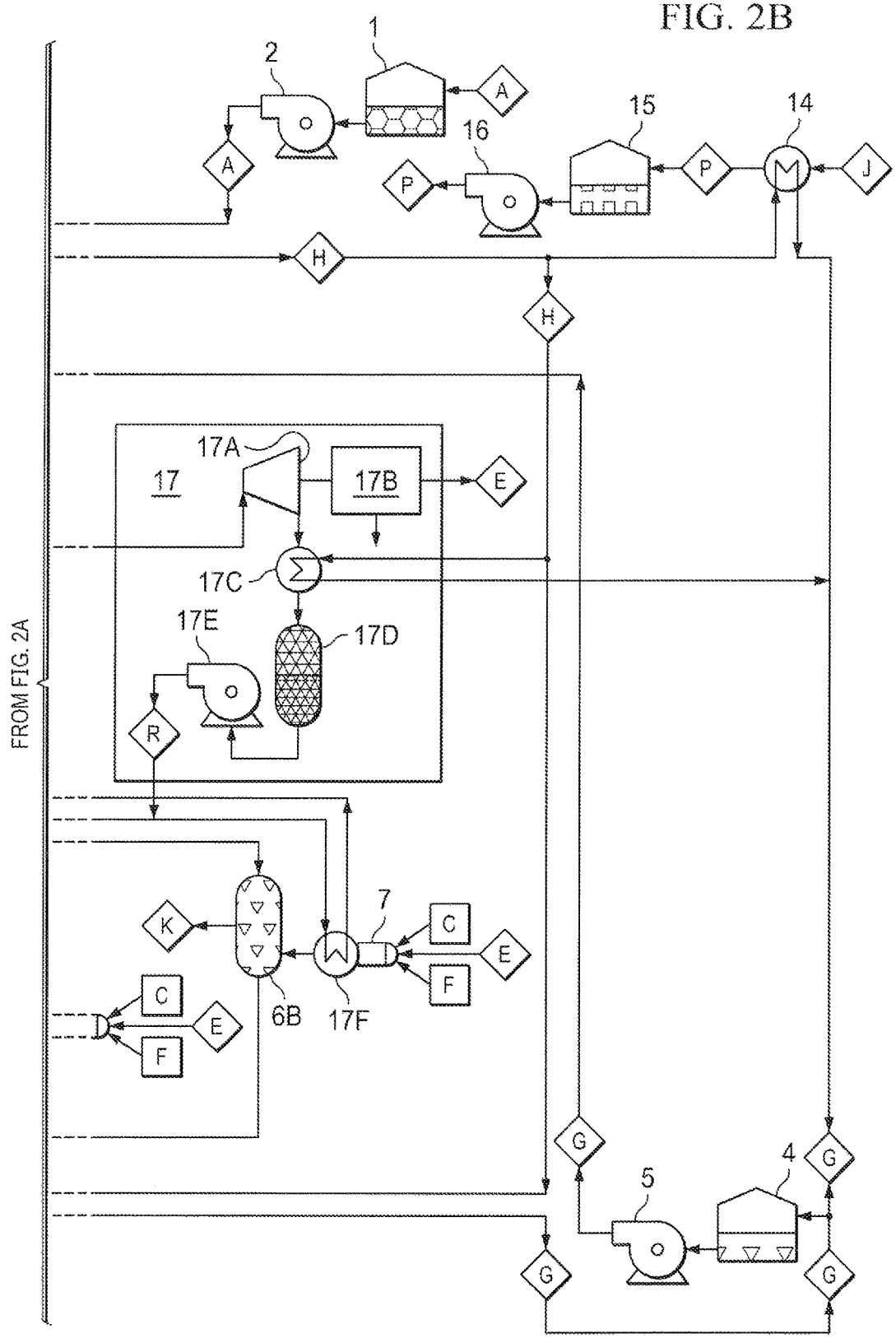

FIGS. 2A-B represent the embodiments given in FIGS. 1A-B with the addition of the production of electrical power using an organic Rankine cycle, ORC, engine and generator 17. Superheated organic refrigerant vapor Q is expanded through a turbine wheel 17A, producing power to turn electrical generator 17R. Electrical power E can be used locally to power the process or sold to the grid, reducing the cost to evaporate saltwater. Heat exchanger 17C then condenses the vapor using cooling media supply H and stores it in tank 17D. Pump 17E conveys liquid refrigerant R at high pressure into boiler/heat exchanger 17F, which produces superheated vapor Q. Heat for the ORC process is provided by burner 7 prior to exhaust gasses entering contact towers 6A or 6B. Excess heat transferred to cooling media H also promotes additional evaporation in cooling tower 3.

Figure 3A:
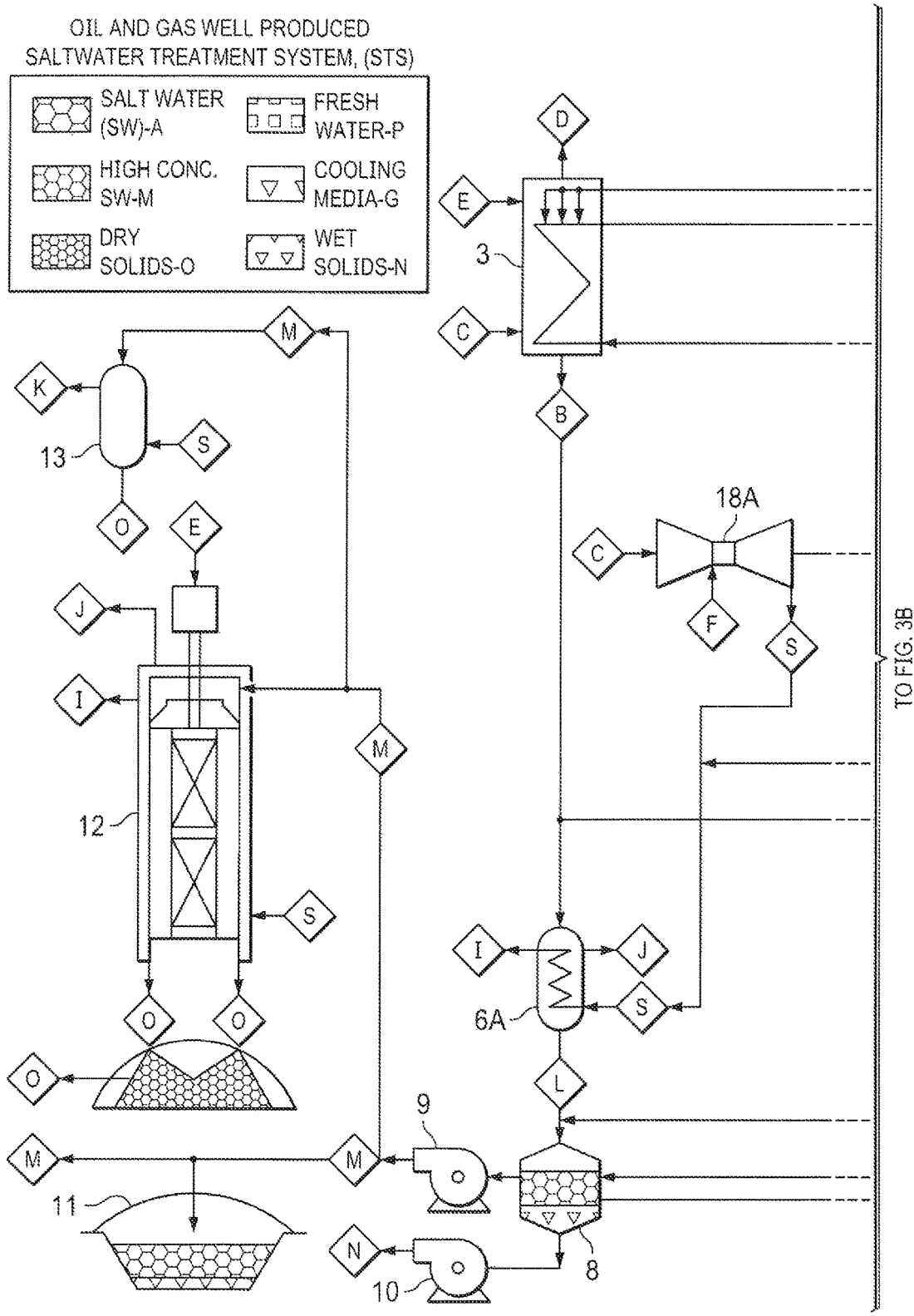
FIGS. 3A and 3B together show a schematic depiction of the embodiment depicted in FIGS. 1A and 1B with an Internal Combustion Engine and electrical generator providing the heat for the process and to generate additional income from the sale of electricity.
Figure 3B:
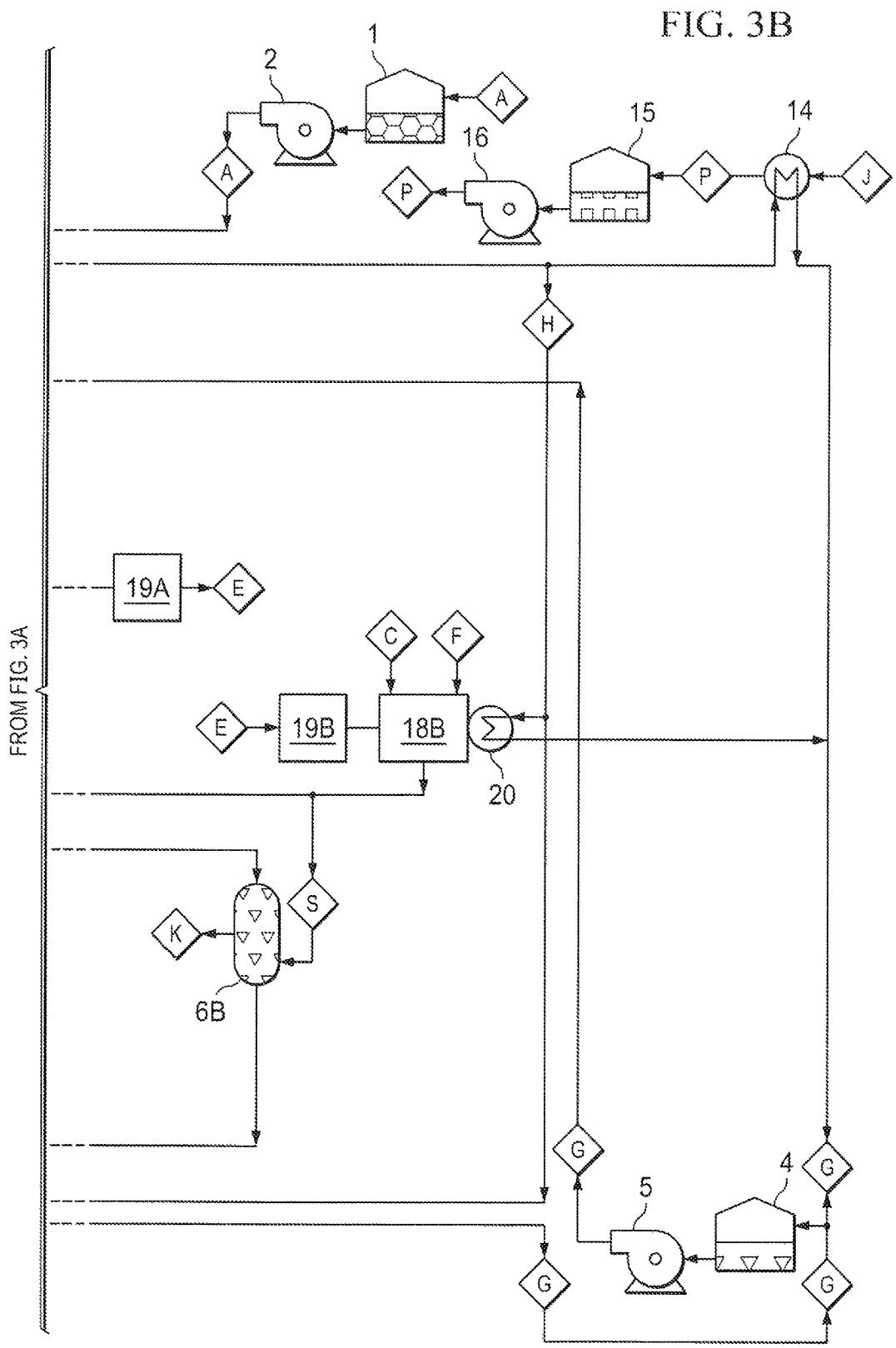

FIGS. 3A-B represent the embodiments given in FIGS. 1A-B and 2A-B with the addition of an internal combustion engine and generator to produce electrical power. A turbine engine 18A or piston engine 18B use well gas F and air G to produce power to drive generators 19A or 19B producing electrical power E. Exhaust streams S replace burners on contact towers 6A or 6B. Heat exchanger 20 transfers heat from piston engine jacket water to cooling media, promoting evaporation in cooling tower 3. Electrical power E can be used locally to power the process or sold to the grid, reducing the cost to evaporate saltwater.

Figure 4A:
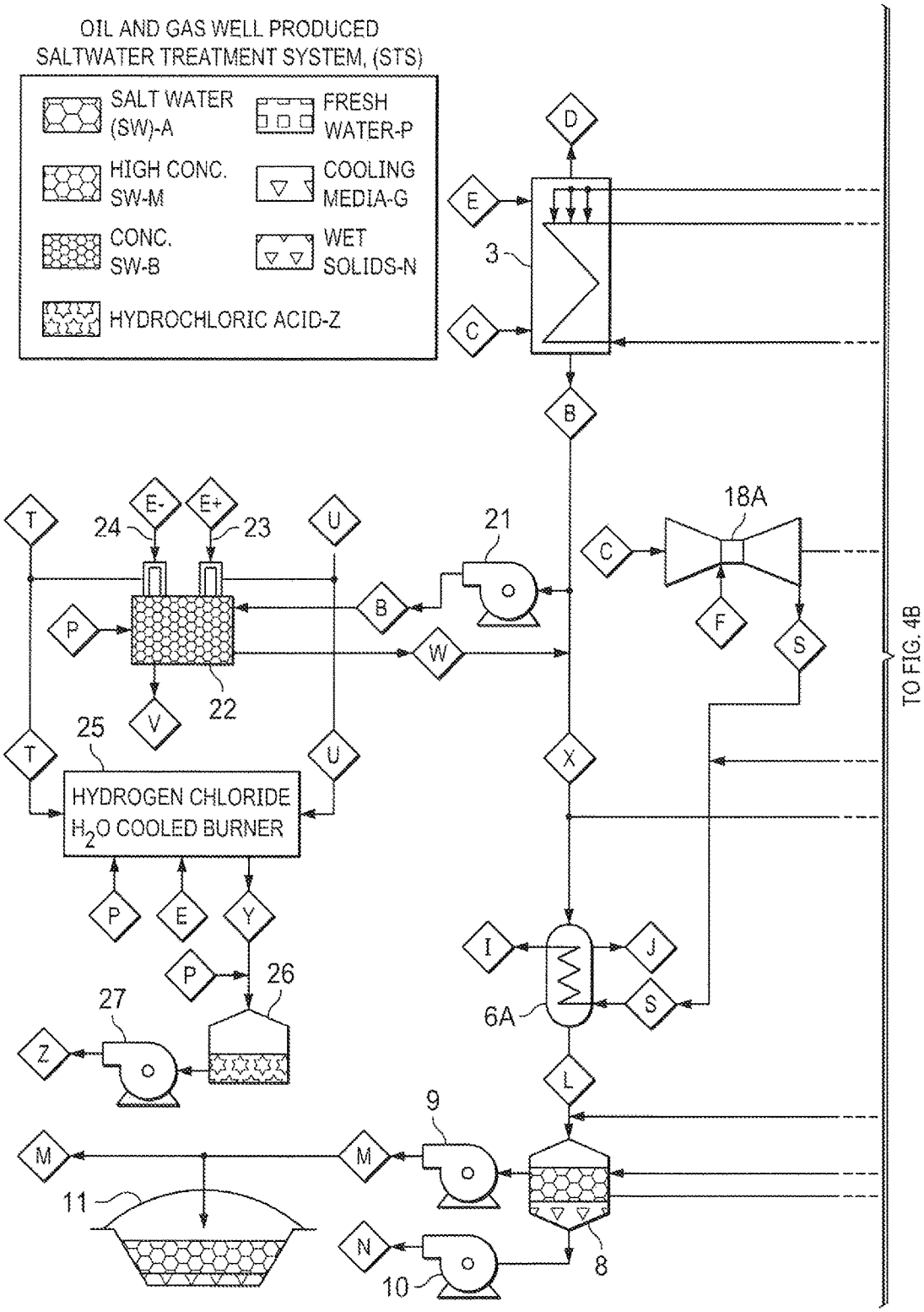
FIGS. 4A and 4B together show a schematic depiction of the embodiment depicted in FIGS. 3A and 3B with the addition of a system to produce hydrochloric acid and hydroxides as byproducts of treating water to remove salts.
Figure 4B:
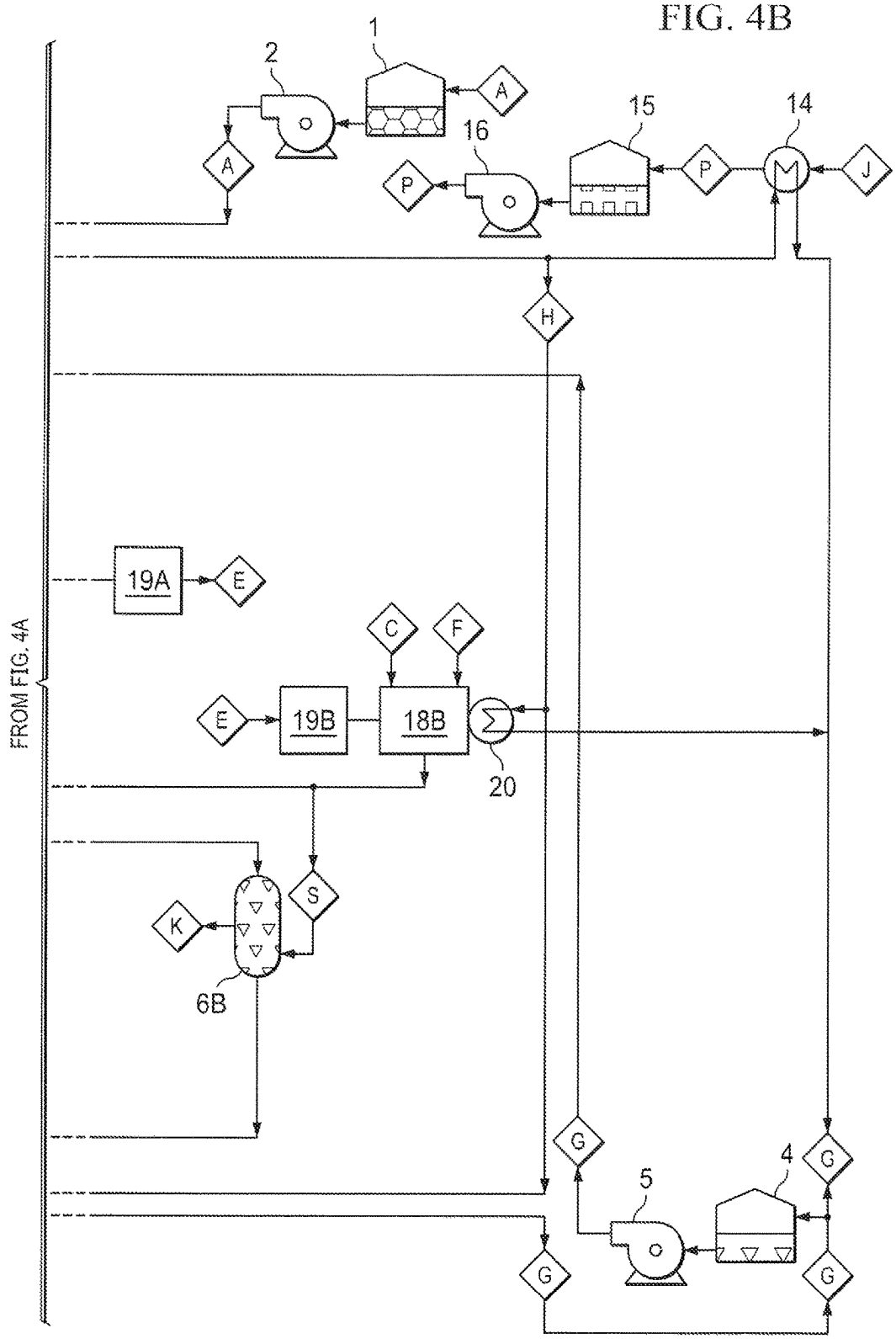

FIGS. 4A-B represent the embodiments given in FIGS. 1A-B, 2A-B and 3A-B, with the addition of a Chlor-Alkali process that produces hydrochloric acid. Concentrated saltwater B is diverted by pump 21 to one side of a Chlor-Alkali vessel 22, which is separated into two sections by a membrane. This side/section contains an anode 23 and produces chlorine gas U along with lower concentration saltwater W, which returns to the concentrated saltwater stream B combining to form stream W, which flows to the contact tower 6A or 6B. The other side of vessel 22 containing cathode 24, receives freshwater P from pump 16 and produces hydrogen gas T and hydroxides V from sodium and calcium ions, which cross the membrane. The concentrated calcium and sodium hydroxides V would be collected and sold to the market. DC electrical voltage is applied across the anode and cathode E+ & E− driving the chemical reaction. Hydrogen T and Chlorine U are combined in a Hydrogen Chloride Burner 25, and along with freshwater P and electricity E, form concentrated hydrochloric acid Y. Freshwater P is added to the hydrochloric acid to adjust the concentration before it is stored in tank 26. The final product Z is transferred to tanker trucks via pump 27, where it is sold to the market or used as a well tracking additive or tor well production enhancement. The Chlor-Alkali process would produce additional revenues and further reduce the cost of processing the saltwater.

Figure 5A:
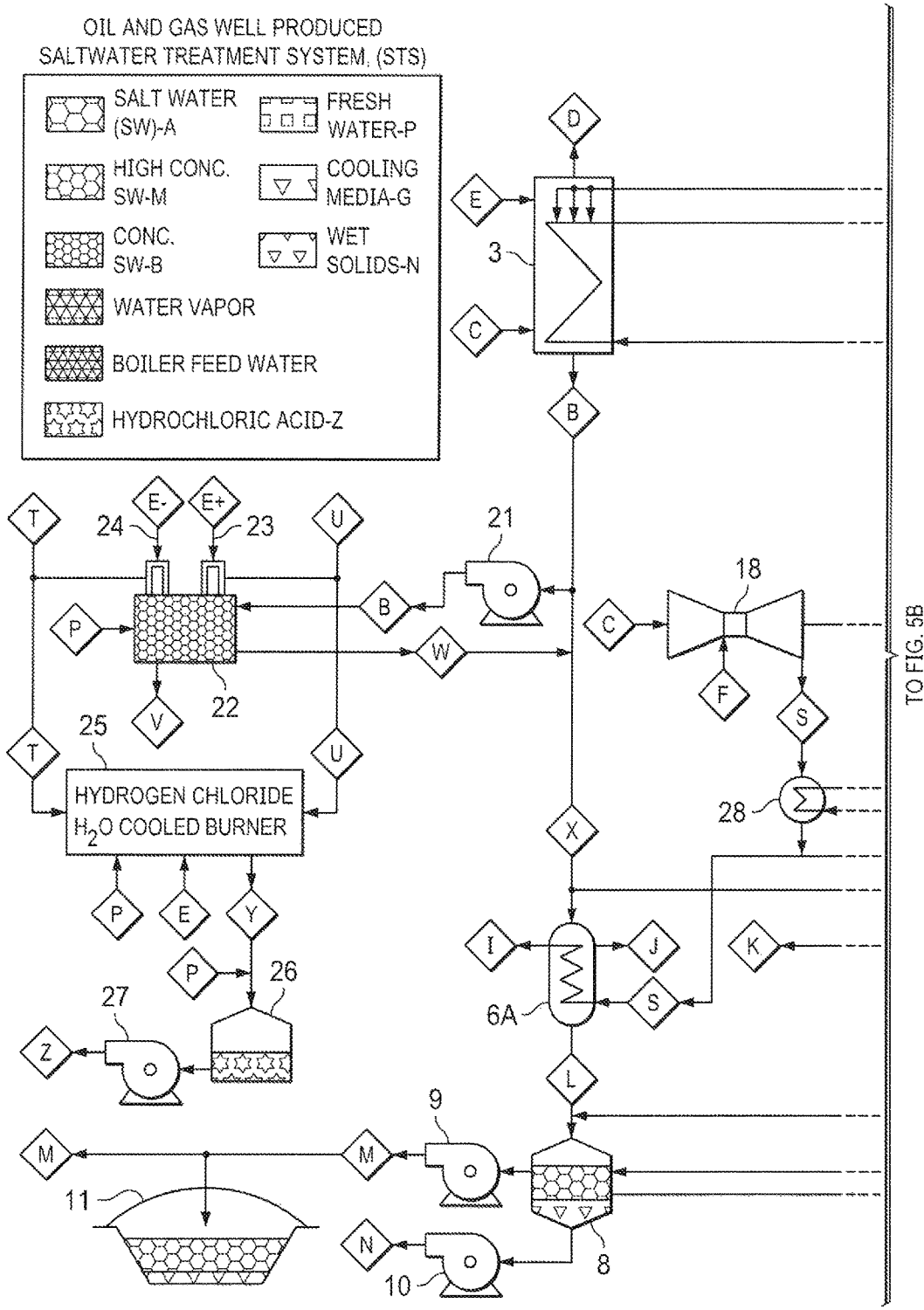
FIGS. 5A and 5B together show a schematic depiction of the embodiment depicted in FIGS. 4A and 4B with the addition of a cogeneration unit to increase electrical production efficiency.
Figure 5B:
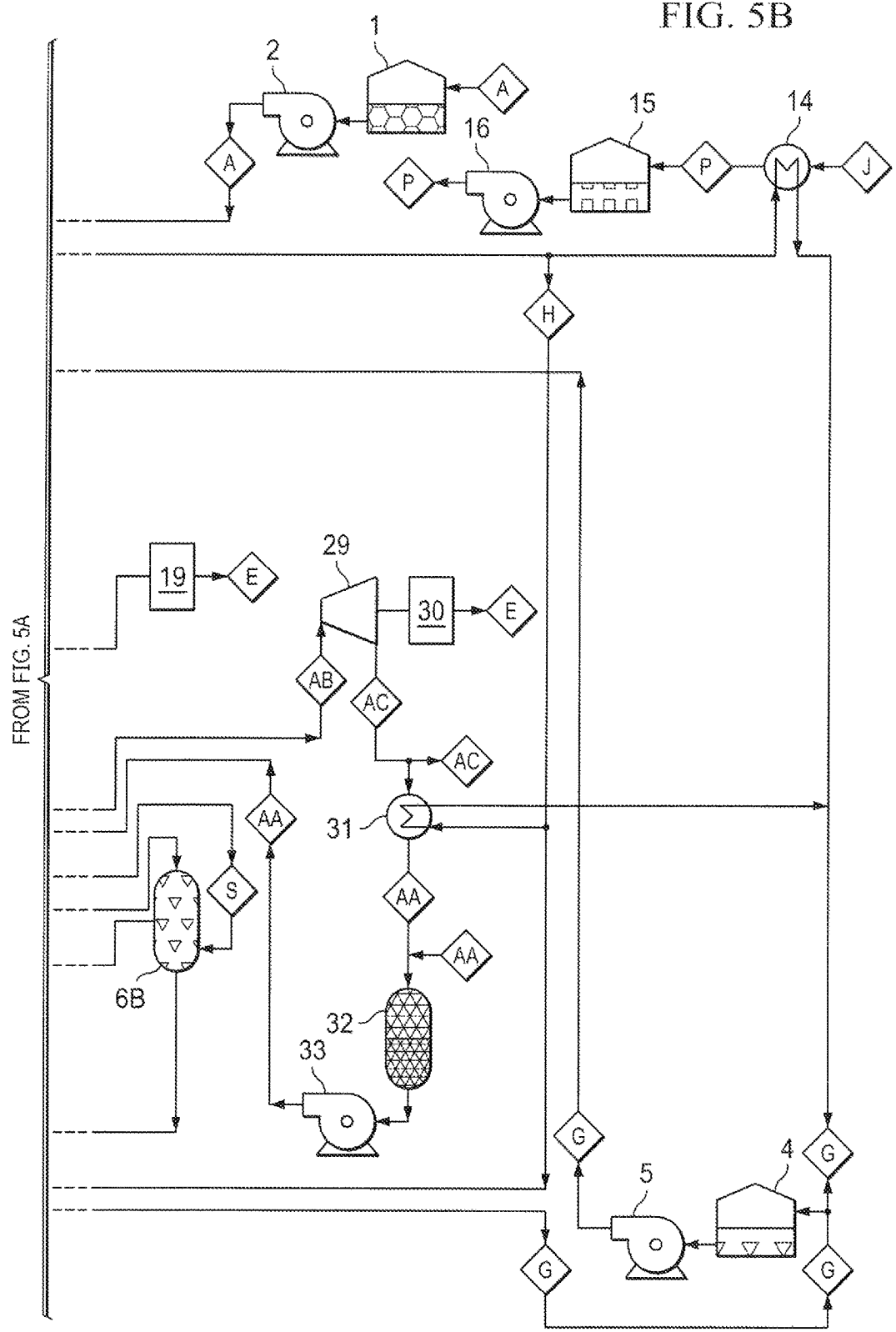

FIGS. 5A-B represent the embodiments given in FIGS. 1A-B, 2A-B, 3A-B and 4A-B, with the addition of a steam cogeneration system added to the internal combustion engine to increase the electrical power produced and improve the economics of evaporating the saltwater. Internal combustion engine exhaust S enters hot gas steam generator 28 before continuing to the contact tower 6. The hot gas steam generator receives feed water AA and produces superheated steam AB. The Superheated steam enters steam turbine 29 where mechanical energy is extracted which drives electrical generator 30 producing electricity E. Low Pressure saturated steam AC leaves the steam turbine and is either used for other processes or is condensed in heat exchanger 31. Cooling media H is circulated through the condenser picking up heat from the condensing steam, returning to tank 4 before being pumped to the evaporative fluid cooler 3, which increases evaporation, further reducing the saltwater volume. The condensed feed water is stored in tank 32 and conveyed back to the steam generator by Pump 33. The addition of the steam cogeneration system would produce additional revenues and further reduce the cost of processing the saltwater.

Figure 6A:
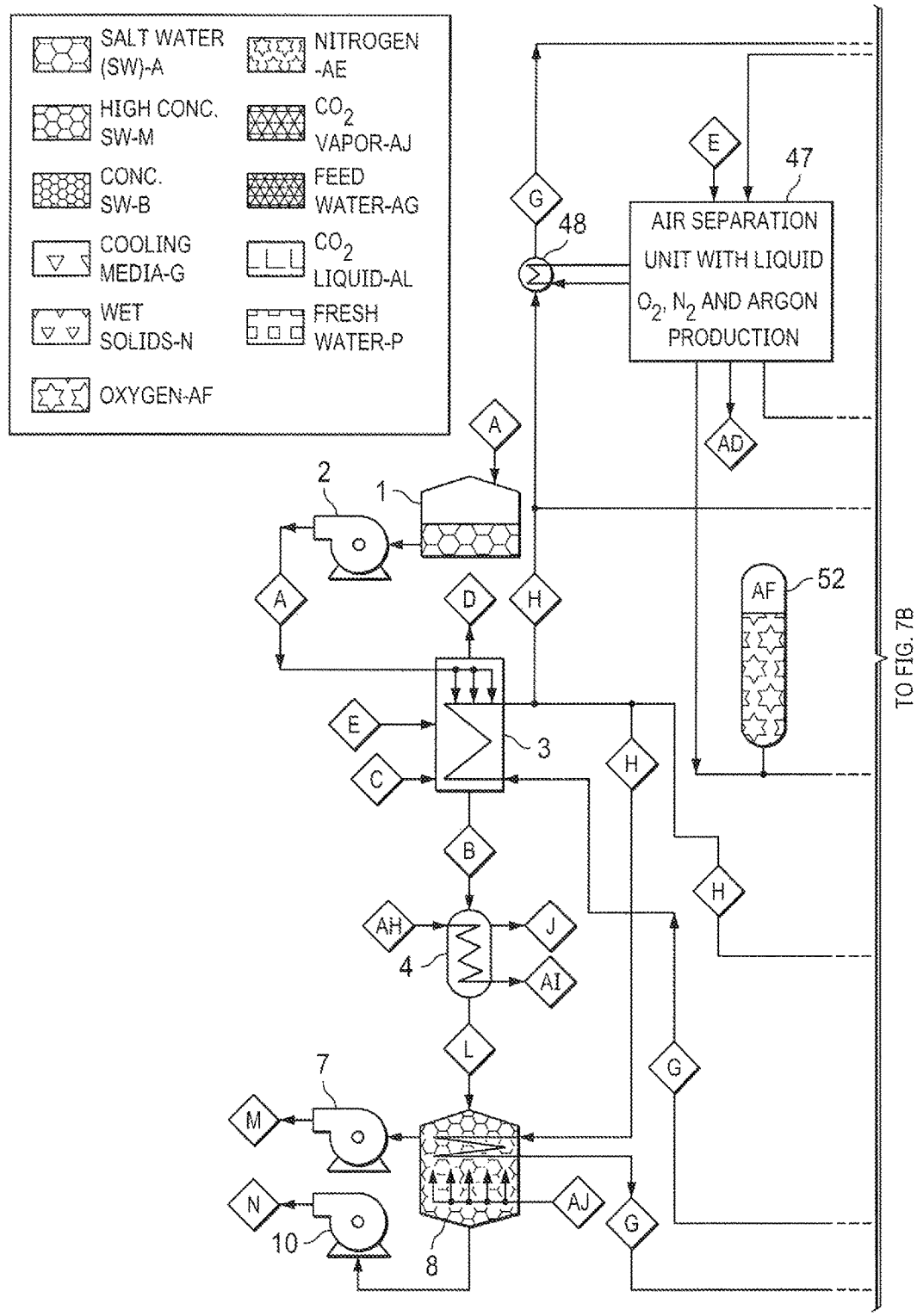
FIGS. 6A, 6B, and 6C together show a schematic depiction of the embodiments depicted in FIGS. 5A and 5B with the addition of an air separation unit and new concept power production unit Zero Emission Engine, (ZEE), without compressor to reduce or eliminate emissions while maximizing electrical power production.
Figure 6B:
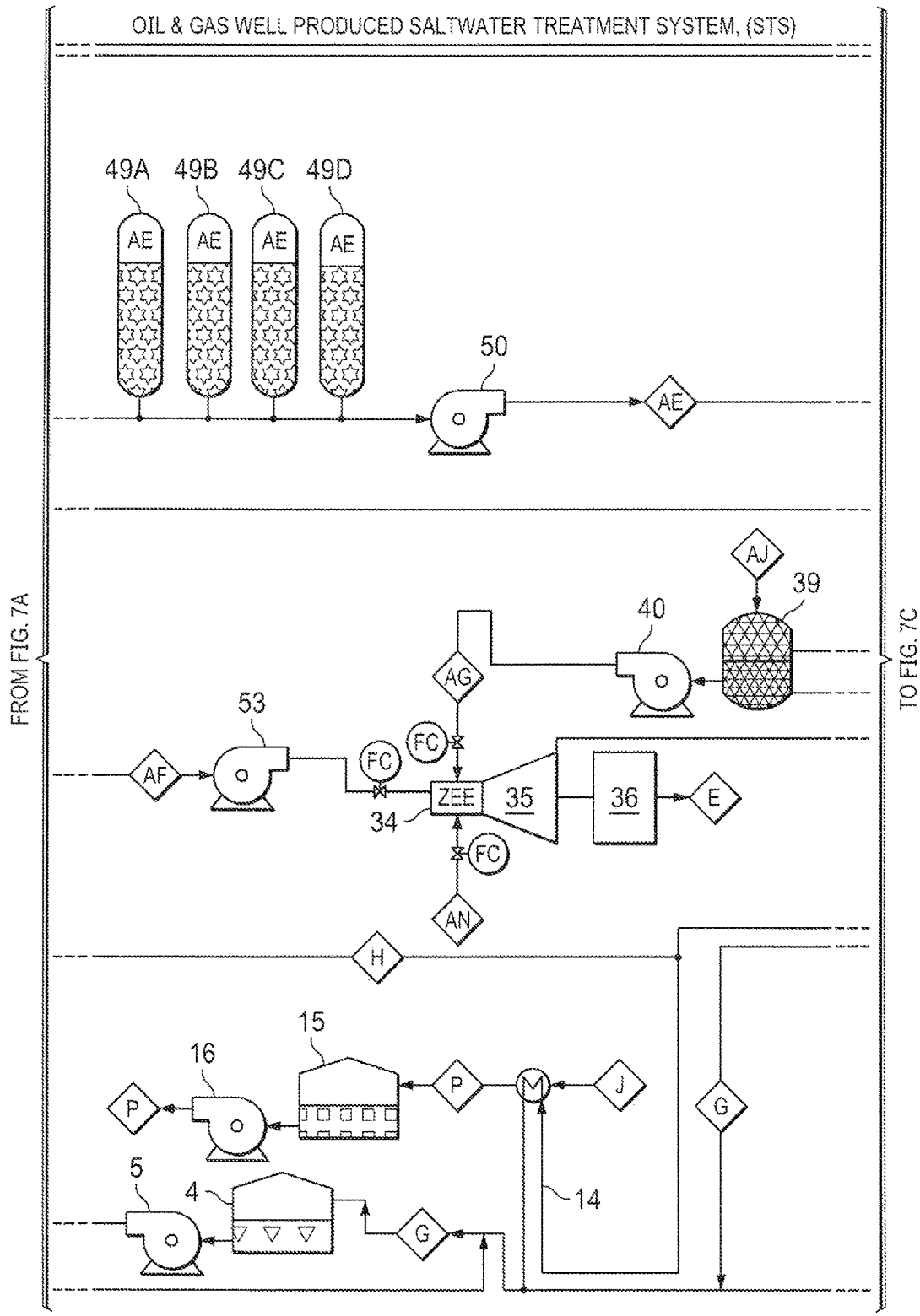
Figure 6C:
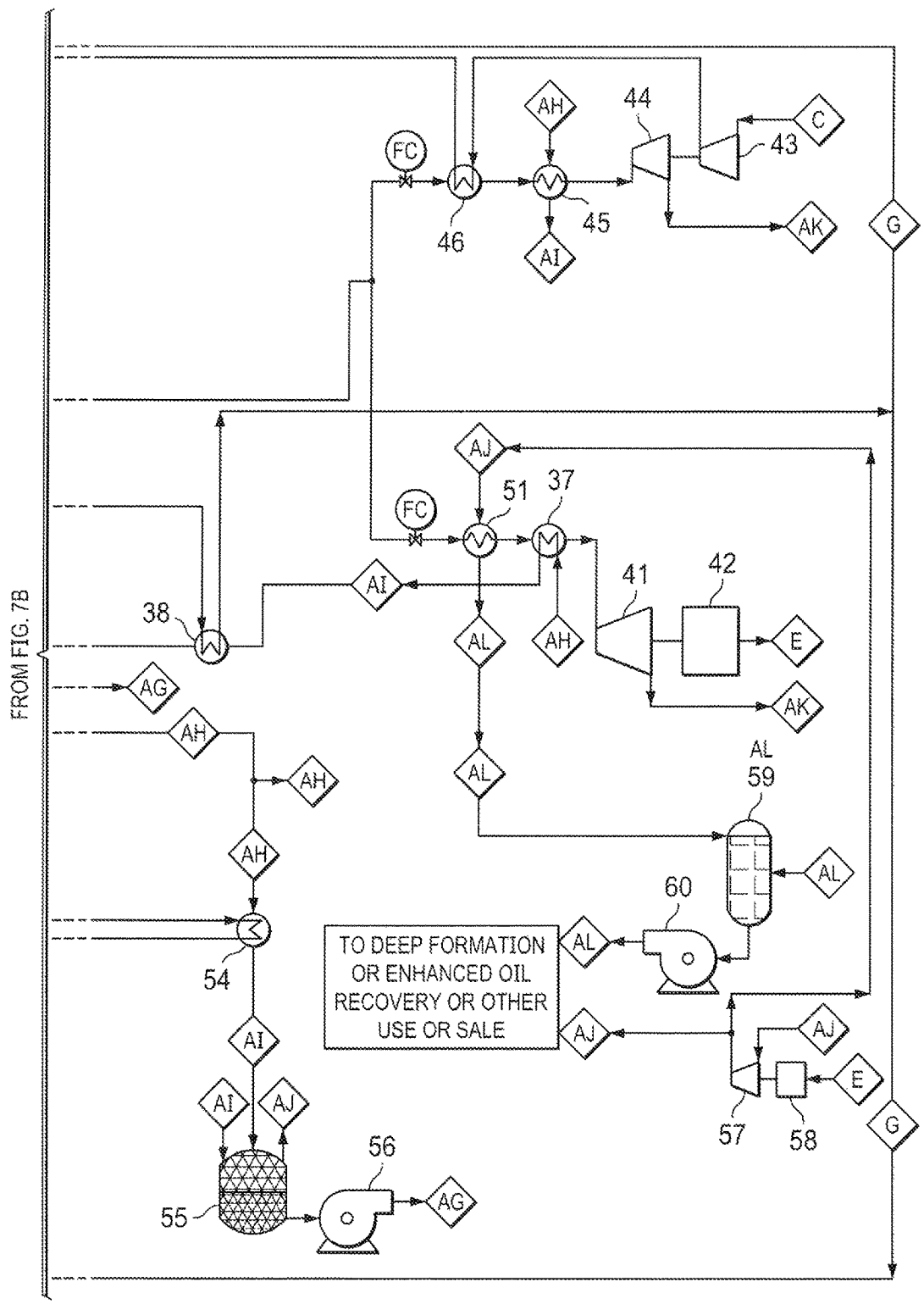

FIGS. 6A-C represent the embodiments given in FIGS. 1A-B, 2A-B, 3A-B, 4A-B and 5A-B, with the addition of an inventive zero emissions engine, (ZEE), that will convert wellhead natural gas into carbon 35 neutral, emission free electrical and thermal energy. The ZEE 34 receives extremely high pressure wellhead gas F, liquid oxygen AF and distilled water AG via controls valves FC and produces extremely high pressure and high temperature carbon dioxide and water vapor, which creates mechanical energy in the turbine 35 and exits as exhaust AH. The ZEE turbine, not having to drive a compressor, transfers most of its energy to electrical generator 36 which produces electricity E. All or part of the ZEE exhaust stream AH is diverted to heal exchanger 37, where its thermal energy is transferred to liquid nitrogen AE. All or part of the water in AH is condensed and exits as saturated water and carbon dioxide AI, which is further cooled in heat exchanger 38 before entering vessel 39 where the carbon dioxide AJ is separated from the distilled water AG. Pump 40 feeds distilled water to the ZEE 34 via a control valve to provide a method to keep temperatures at or below component limitations. Distilled water AG can also be transferred to other uses or sales. The liquid nitrogen AE boiled in heat exchanger 37 produces extremely high pressure medium temperature nitrogen gas which drives nitrogen turbine 41, producing mechanical energy to drive electrical generator 42 producing electrical power E. Nitrogen gas AK exits to atmosphere at low pressure and low temperature.

As part of the ZEE, a method to produce liquid oxygen and nitrogen is included. Air C is pressurized a predetermined amount by compressor 43, which is powered by nitrogen turbine 44 by extremely high pressure medium temperature nitrogen gas from heat exchanger 45. Thermal energy to boil and increase the temperature of the nitrogen is supplied by ZEE exhaust AH. Pressurized air is cooled by the boiling liquid nitrogen AE in heat exchanger 46 upstream of heat exchanger 45 before it is sent to the air separation unit 47. The unit uses electrical power to produce liquid argon AD, liquid nitrogen AE and liquid oxygen AF. The sale of argon should add enough income to pay for the air separation unit operational and capital costs. Cooling for the air separation unit is provided by cooling media H and in heat exchanger 48. Liquid nitrogen AE flows from the air separation unit to storage tanks 49A-D, where it is held for use as required for die ZEE process. Pump 50 delivers the nitrogen at extremely high pressure to either heat exchanger 46 or 51 via control valves for vaporization and superheating. The advantage of storage is that the production of electricity with the nitrogen can be available for on peak periods, usually between 9:00 am and 3:00 pm week days, when the value of the electricity increases. This maximizes the income from produced electrical power, further reducing the cost to process saltwater. Liquid oxygen AF flows from the air separation unit to storage tanks 52, where it is held for use as required for the ZEE process. Pump 53 delivers the oxygen at extremely high pressure to the ZEE burner 34 via control valve FC.

A final component of the ZEE system is a method to collect and utilize or sequester the carbon dioxide AJ. An additional heat exchanger 54 will condense water from unutilized exhaust stream AH sending it along with carbon dioxide vapor as stream AI to vessel 55, where it is separated into carbon dioxide vapor AJ and distilled water AC. Other AI streams will also be collected from other areas of the process, such as contact vessel 4. Carbon dioxide vapor AJ from vessels 55 and 39 will be directed to compressor 57, driven by electric motor 58, and either sent to geological sequestration in deep formation saline aquifer, mineral sequestration such as carbonates, enhanced oil recovery, other use, sale or heal exchanger 51 for condensation into liquid carbon dioxide AL. Liquid carbon dioxide will be stored in vessel 58 for later sale or use, being conveyed by pump 60. One way carbonate sequestration can occur is when carbon dioxide AJ is bubbled into vessel 8. When the saltwater solution is exposed to the carbon dioxide, the hydroxide ions reacts rapidly with it to form bicarbonate ions and when combined with calcium or sodium ions form calcium carbonates or sodium carbonates. The carbon dioxide can also be used to provide enhance oil recovery in local or regional oil bearing formations. The addition of the zero emissions engine concept, ZEE system along with the production of related co-products, would produce additional revenues and further reduce the cost of processing the saltwater with little or no environmental impact.

Figure 7A:
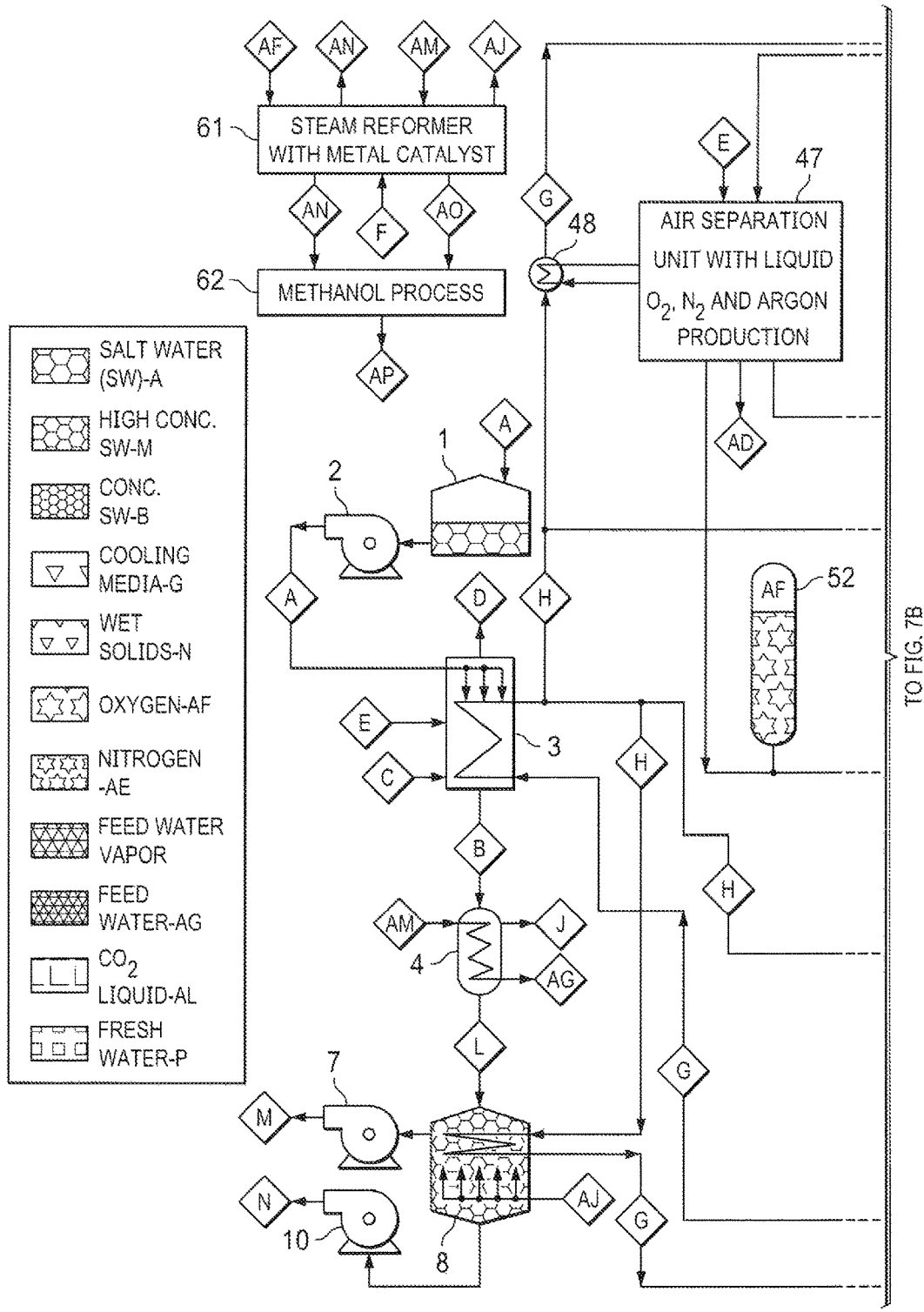
FIGS. 7A, 7B, and 7C together show a schematic depiction of the embodiment depicted in FIGS. 6A, 6B, and 6C with the addition of a steam reformer to produce hydrogen fuel and further reduce or eliminate emissions while maximizing electrical power production and allow for the production of coproducts such as methanol and ammonia.
Figure 7B:
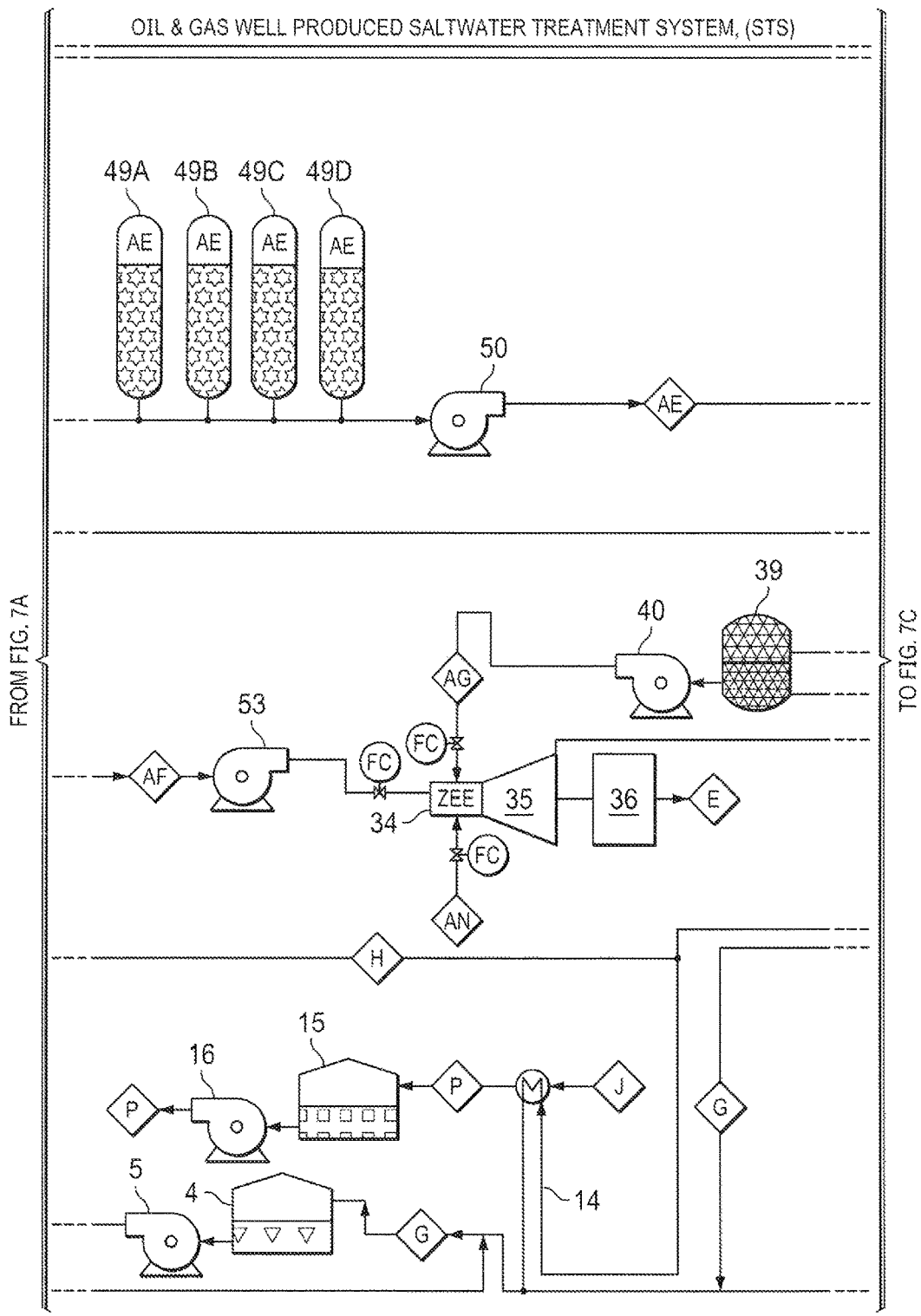
Figure 7C:
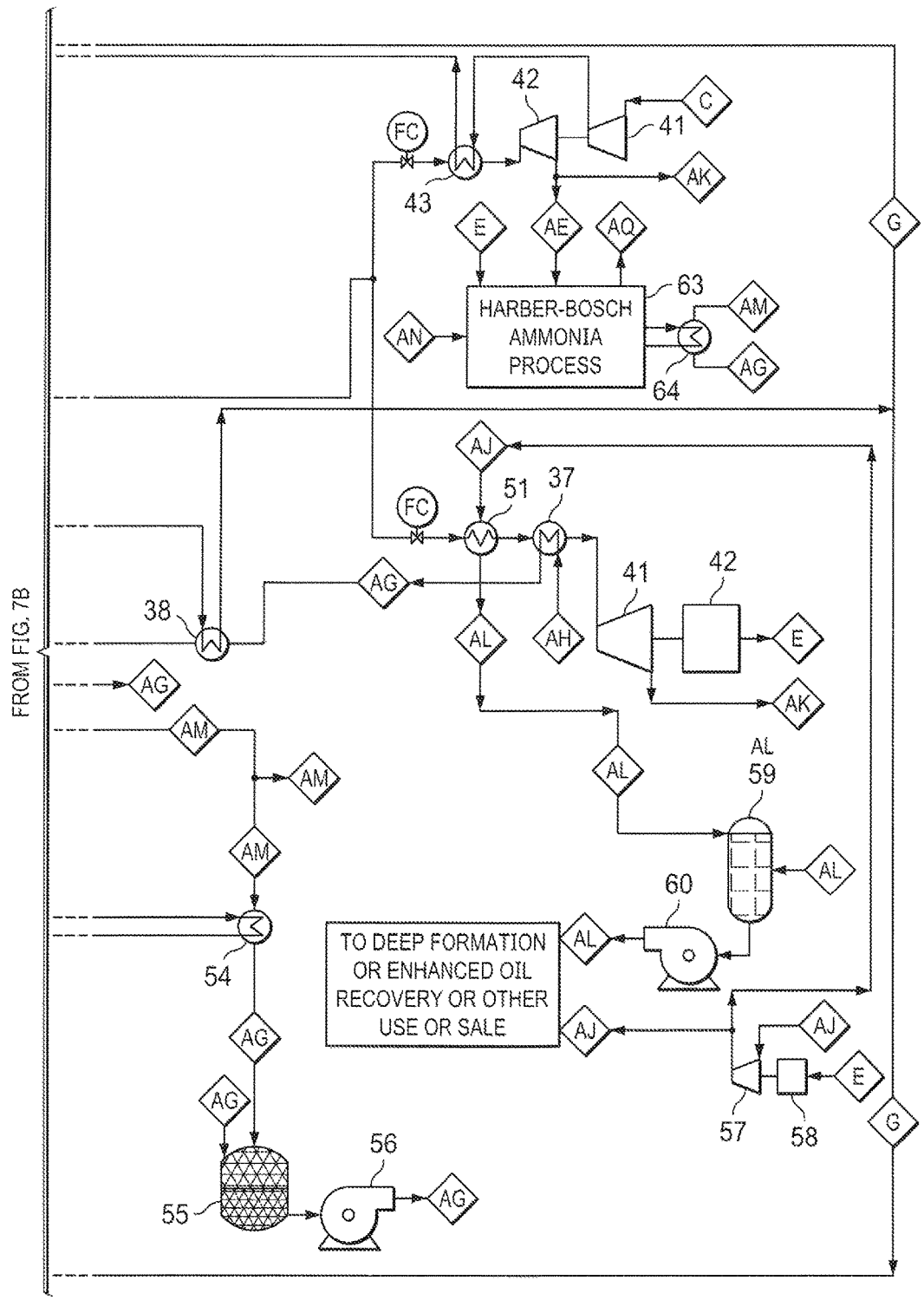

FIGS. 7A-C represent the embodiments given in FIGS. 1A-B, 2A-B, 3A-B, 4A-B, 5A-B and 6A-C, with the addition of a hydrogen production unit similar to a steam reformer with metal catalyst. The use of hydrogen in the zero emissions engine, ZEE, concept simplifies the capture of carbon dioxide by keeping it out of the exhaust stream. With hydrogen as a fuel the ZEE produces only steam in the exhaust AM, allowing for multiple uses of the exhaust after leaving the ZEE turbine. A steam reformer with metal catalyst 61, receives wellhead gas F, oxygen AF and steam AM and produces hydrogen AN and carbon dioxide AJ. All or part of the hydrogen is sent to the ZEE for combustion. The addition of the hydrogen reformer also allows the production of other products from the available hydrogen, steam, oxygen and nitrogen. A methanol process 62 can be added to take hydrogen AN and carbon monoxide AO and produce methanol AP. Process heating and cooling can be provided by cooling media H and steam AM. An ammonia process such as Harber-Boseh 63 would take hydrogen AN, nitrogen AE and produce ammonia AQ. Process heating is provided by heat exchanger 64, using steam AM and returning condensed distilled water AG. The addition of the steam reformer to the zero emissions engine, ZEE, concept system allows for a more cost effective process of producing mechanical and thermal energy and the production of additional products such as methanol and ammonia. All of this would produce additional revenues and further reduce the cost of processing the saltwater with little or no environmental impact.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A method fir reducing or eliminating a saltwater solution that is generated as a result of oil and/or gas production from, or fracking of, a well comprising:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream;
   (c) cooling the further concentrated stream by indirect heat exchange with a cooling media to a temperature below the saturation point of the further concentrated stream to release solids which separate from the further concentrated stream to form a solids product and a saturated saltwater product; and
   d) prior to cooling the further concentrated stream in step (c), cooling the cooling media by transferring heat from the cooling media to the saltwater solution in the evaporative fluid cooler in step (a).

2. The method of claim 1 wherein in step (b) the concentrated saltwater solution is heated by direct or indirect heat transfer from a combustion gas stream produced by the combustion of a wellhead gas from the well.

3. The method of claim 2 wherein the further concentrated stream is cooled in step (c) in a holding tank.

4. The method of claim 2 wherein the combustion gas stream used in step (b) is produced by the combustion of the wellhead gas in an internal combustion engine which drives an electrical generator to produce electrical power.

5. The method of claim 4 wherein, prior to being used in step (b), the combustion gas stream produced by the internal combustion engine is used for heat transfer to heat steam in a cogeneration system which produces electricity.

6. A method for reducing or eliminating a saltwater solution that is generated as a result of oil and/or gas production from, or fracking of, a well comprising:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream; and
   (c) driving an electrical generator using a zero emissions engine (ZEE) which produces a ZEE exhaust stream from (i) a wellhead gas from the well or a hydrogen stream produced from the wellhead gas, (ii) liquid oxygen, and (iii) water, and wherein the ZEE exhaust stream is used (1) in step (b) to heat the concentrated saltwater solution, (2) to heat liquid nitrogen to drive a nitrogen turbine, or (3) a combination thereof.

7. The method of claim 6 further comprising the step of recovering $CO_2$ from the ZEE exhaust stream.

8. The method of claim 7 further comprising the step of bubbling the $CO_2$ through the further concentrated stream produced in step (b) while cooling the further concentrated stream to cause solids to precipitate from the further concentrated stream.

9. The method of claim 6 further comprising the step of producing the liquid oxygen for the zero emissions engine by air separation.

10. The method of claim 9 further comprising the step of recovering argon when producing liquid oxygen by air separation.

11. The method of claim 6 further comprising the step of producing hydrogen in a reformer unit using the wellhead gas from the well, wherein the reformer unit also produces a steam product and wherein at least a portion of the hydrogen is used as a fuel in the zero emissions engine.

12. The method of claim 11 further comprising the step of producing methanol from a portion of the hydrogen.

13. The method of claim 11 further comprising the step of producing an ammonia product from a portion of the hydrogen.

14. A method for reducing or eliminating a saltwater solution that is generated as a result of oil and/or gas production from, or fracking of, a well comprising:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream;
   (c) cooling the further concentrated stream by indirect heat exchange with a cooling media to a temperature below the saturation point of the further concentrated stream to release solids which separate from the further concentrated stream to form a solids product and a saturated saltwater product; and
   (d) reducing the saturated saltwater product to water vapor and dry solids in a flash dryer in which the saturated saltwater product is sprayed into an exhaust stream produced by combusting a mixture of air and wellhead gas from the well.

15. A method for reducing or eliminating a saltwater solution that is generated as a result of oil and/or gas production from, or fracking of, a well comprising:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream;
   (c) cooling the further concentrated stream by indirect heat exchange with a cooling media to a temperature below the saturation point of the further concentrated stream to release solids which separate from the further concentrated stream to form a solids product and a saturated saltwater product; and
   (d) reducing the saturated saltwater product in a thin film evaporator tower in which the saturated saltwater product is fed to the top of the thin film evaporator tower and flows downwardly along an inner wall of a heat transfer surface in a thin film developed by rotating blades within the thin film evaporator tower so that water evaporates from the saturated saltwater product and a salt product collects in a bottom of the thin film evaporator tower.

16. A method for reducing or eliminating a saltwater solution that is generated as a result of oil and/or gas production from, or fracking of, a well comprising:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream, by direct or indirect heat transfer from a combustion gas steam produced by combusting (i) a wellhead gas from the well or (ii) hydrogen produced from the wellhead gas; and
   (c) recovering heat from the combustion gas stream to produce electrical power using an organic Rankine cycle engine and generator.

17. The method of claim 16 wherein the combustion gas stream is a burner discharge stream produced by combusting the wellhead gas or hydrogen in a burner.

18. A method for reducing or eliminating a saltwater solution that is generated as a result of oil and/or gas production from, or fracking of, a well comprising:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream; and
   (c) after step (a) and prior to step (b), using at least a portion of the concentrated saltwater solution in a Chlor-Alkali process to produce chlorine gas, hydroxides and hydrochloric acid.

19. A method for reducing or eliminating a saltwater solution comprising the steps of:
   (a) delivering the saltwater solution through an evaporative fluid cooler which evaporates a portion of the water in the saltwater solution to produce a concentrated saltwater solution;
   (b) boiling off or evaporating additional water from the concentrated saltwater solution, to produce a further concentrated stream; and
   (c) driving an electrical generator using a zero emissions engine (ZEE) which produces a ZEE exhaust stream, wherein the ZEE exhaust stream is used (1) in step (b) to heat the concentrated saltwater solution, (2) to heat liquid nitrogen to drive a nitrogen turbine, or (3) a combination thereof.

20. The method of claim 19 further comprising the steps of:
   (i) recovering $CO_2$ from the ZEE exhaust stream and
   (ii) bubbling the $CO_2$ through the further concentrated stream produced in step (b) while cooling the further concentrated stream to cause solids to precipitate from the further concentrated stream.

* * * * *

UNITED STATES PATENT AND TRADEMARK OFFICE
CERTIFICATE OF CORRECTION

PATENT NO. : 10,465,491 B2  Page 1 of 1
APPLICATION NO. : 15/685863
DATED : November 5, 2019
INVENTOR(S) : Joe Travis Moore It is certified that error appears in the above-identified patent and that said Letters Patent is hereby corrected as shown below:

In the Claims

Claim 1, Column 9, Line 16: Replace the word "fir" with "for"

Signed and Sealed this
Second Day of June, 2020

Andrei Iancu
*Director of the United States Patent and Trademark Office*